Feb. 8, 1966     S. B. JONES     3,233,504
CLAMPING DEVICE WITH REVERSED THREAD ARRANGEMENT
Filed April 2, 1962
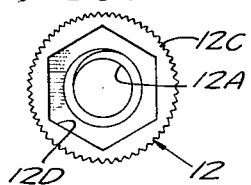
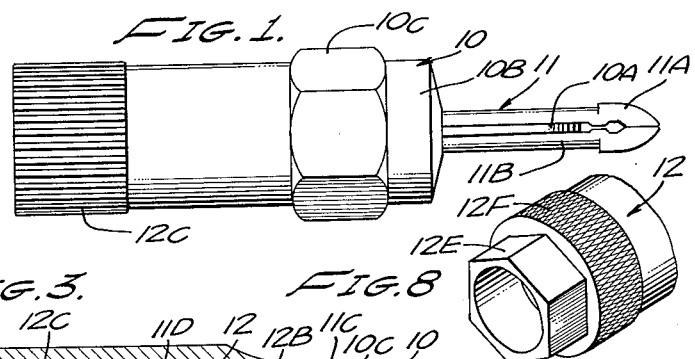
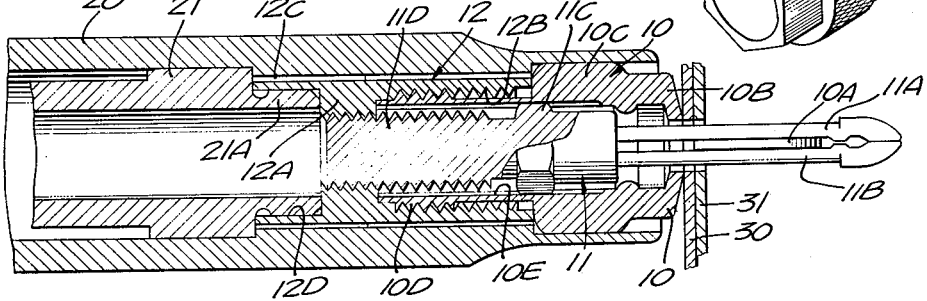
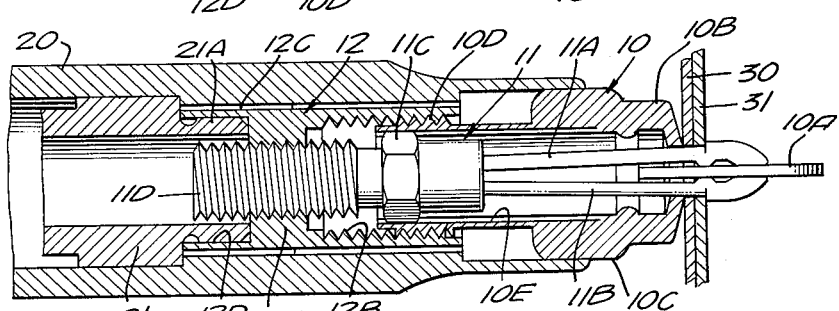
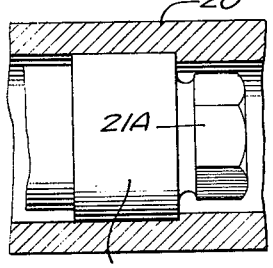
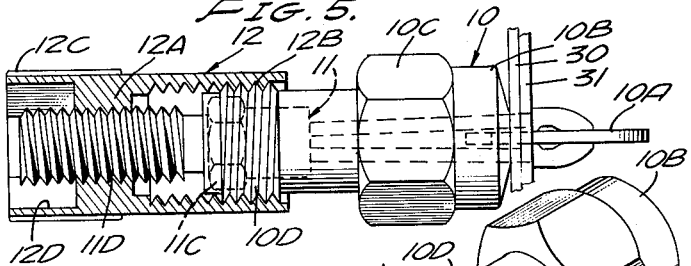
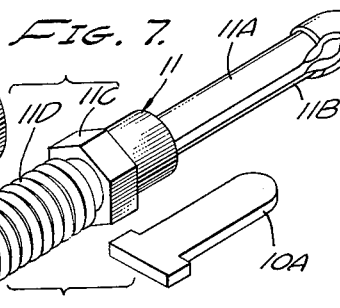
INVENTOR.
STERLING B. JONES
BY Lyon & Lyon
ATTORNEYS

United States Patent Office 3,233,504
Patented Feb. 8, 1966

3,233,504
CLAMPING DEVICE WITH REVERSED THREAD ARRANGEMENT
Sterling B. Jones, West Covina, Calif., assignor to Monogram Industries, Inc., a corporation of California
Filed Apr. 2, 1962, Ser. No. 184,272
7 Claims. (Cl. 85—81)

The present invention relates generally to fastening means and more specifically to a fastener for temporarily securing sheet metal together as, for example, in the process of riveting skin sections on aircraft.

The fastener described herein involves essentially three screw-threaded elements involving right and left hand screw threads for easy and quick attachment to and from the metal sheets temporarily fastened or clamped by the fastener. These three elements are generally a sleeve member, a screw member and a nut member. The sleeve member mounts a spreader which cooperates with a pair of cantilever needle members on the screw member to spread the same and such sleeve member is fabricated with (a) an external right-hand thread cooperating with a like thread on the nut member; (b) internal lands cooperating with flat portions of the screw for preventing relative rotation; and (c) an external hexagonal portion useful in preventing turning when the fastener is being used. The screw member carries the above-mentioned needles, has the previously mentioned flat portions and is also provided with external left-hand threads engaging a like internally threaded portion of the nut member. The nut member is provided with two threaded portions, a left-hand threaded portion engageable with like threads on the screw and a right-hand threaded portion engageable with like threads on the sleeve, and is also provided with convenient means for turning of the same to effect quick and esay fastening to and release from sheets that are to be fastened.

It is accordingly a general object of the present invention to provide a fastener of this character.

Another object of the present invention is to provide a fastener of this character which accomplishes its task in a fast and simple manner.

Another object of the present invention is to provide an improved fastener of this character which is essentially foolproof in its operation, rugged, and capable of many repeated fastening operations.

Another object of the present invention is to provide an improved fastener of this character which may be used with a simple power tool.

Another object of the present invention is to provide a clamp of this character particularly useful for power tool application.

Another object of the present invention is to provide a clamp of this character which requires only approximately one fourth as many turns of its take up nut member to effect a tightening or release compared to a standard type of clamping arrangement commercially used, this feature resulting in approximately 75% less actual driving time required for the application or extraction of each clamp.

Another object of the present invention is to provide a clamp of this character in which the nut member does not free spin when it reaches the extent of its travel during the clamp extraction cycle, but such nut member cooperating with other clamping structure is used to brake an air motor to a complete stop, this feature also resulting in a clamp that is thereby permitted to automatically lock within the barrel of the application power tool without the extra operation of manipulating buttons or levers on the power application tool.

An important feature of the present construction is that unlike standard commercial clamping structures now presently used, in which such prior art clamping structure often remains firmly fixed in the work after a take up nut has been completely run back during the extraction cycle and in which the only way to release the prior art clamp is to hammer the take up shaft forward until the gripping needles are extended out into the relaxed position, with this procedure often resulting in damage to both the clamp and the work, the present clamp embodies very important structural features whereby the holding needles are automatically extended to the relaxed position when and as the take up nut member is run back thereby permitting this nut clamp to be extracted from the work without effort and more important, without damage to the work or the clamp.

Another object of the present invention is to provide an improved clamping structure of this character in which when tightened in the work, the body portion of the same protrudes approximately 1¼ inches less from the work surface than, for example, a standard commercial clamp now being used, this feature being important in that there is less chance of a worker catching his clothes or person on the clamp as he moves past an airframe assembly on a narrow or crowded catwalk. This feature is an important safety factor, not only for the workers but also for the quality of the assembly since the further the clamp protrudes from the work the greater the leverage which may be applied against it when accidentally bumped or struck from the side.

It is therefore another object of the present invention to provide a clamping structure of this character which allows faster performance and with greater safety.

Another object of the present invention is to provide a clamping structure of this character which is particularly adaptable for application and extraction by a power tool but which also may be applied and retracted using conventional wrenches.

Another object of the present invention is to provide a clamping structure of this character which is uniquely adapted for applying and extraction with a power driven tool and in which the clamping structure may be extracted from the work by slipping a barrel of such tool over the clamping structure, applying power to the tool and effecting a discontinuance of power application after the tool has been moved away from the work with the clamping structure therein. In such operation it will be found that this procedure results in the clamping structure remaining in the tool barrel for fast effortless extraction of the clamp without wasted motion, and that when the power is released and the tool is clear of the work, the clamping structure drops freely out of the tool barrel completing an extraction operation in which the worker is not required to struggle with clamps frozen in the work, i.e. the present construction completely eliminates the usual problem where a clamping structure has to be hammered loose from the work even after the nut member thereof has been completely run back.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURES 1 and 2 are side and end elevation views of a fastener embodying the present invention.

FIGURE 3 is a longitudinal sectional view through the fastener of FIGURE 1 and also shows two sheets which are to be fastened as well as parts of a power tool for operating the fastener.

FIGURE 4 is a view of the fastener like FIGURE 2 but shows the fastener in its fastening condition and also shows parts of the power tool.

FIGURE 5 is a view like FIGURE 4 after removal of the power tool.

FIGURE 6 illustrates details of the power tool.

FIGURE 7 is a perspective view illustrating parts of the fastener with the spreader detached from the sleeve.

FIGURE 8 illustrates a modified construction wherein external means are provided on the nut member for applying a torque thereto.

Referring to the drawings, the fastener in general comprises the following elements, namely: (a) the sleeve member 10 which has suitably secured on its forward end a tongue-shaped spreader 10A as, for example, by a swaging operation, and (b) a shank member or screw member 11 having integrally formed therewith a pair of cantilever-supported and deflectable shouldered needle members between which the spreader 10A is movable to outwardly deflect the needle members, and (c) a nut member 12 threaded on both the sleeve member 10 and screw member 11 by right-hand and left-hand threads respectively.

Considering the details of construction of the sleeve member 10, it is seen that the same has a nose portion 10B crimped or swaged as disclosed in my copending application, Serial No. 854,893 filed November 23, 1959, and now abandoned, to secure and retain the spreader 10A. Also, the sleeve member 10 is formed with an external hexagonal portion 10C of larger size than the right-hand externally threaded portion 10D, and internally of sleeve member 10 there is formed a plurality of flats in the form of an internal hexagon 10E which provides lands on which a like external hexagon portion 11C of the screw member 11 may move longitudinally without substantial turning of the screw member 11 within sleeve member 10.

The screw member 11 has integrally formed therewith the previously mentioned and conventional shouldered needle members 11A and 11B, the previously mentioned outer hexagonal portion 11C and an externally left-hand threaded portion 11D engageable with a like internally threaded portion 12A of nut member 12.

The nut member 12 has the previously mentioned internally left-hand threaded portion 12A, the internally right-hand threaded portion 12B, the externally knurled portion 12C and the internal hexagonal portion 12D useful when a fastening tool is used.

Parts of a power tool useful in operation of the fastener are shown in FIGURES 3, 4 and 6 and involve an outer stationary sleeve 20 and an internal rotatable nut driver 21, the sleeve 20 having an internal hexagonal portion at its forward end engageable with the external hexagonal portion 10C of sleeve member 10, and the driver 21 has an external hexagonal portion 21A at its forward end engageable with the internal hexagonal portion 12D of nut 12 for turning the same either in a clockwise or counterclockwise direction. Alternatively, the fastener may be operated by holding the hexagonal portion 10C and using the knurled portion 12C to turn the nut member 12.

In operation of the fastener, the needle members 11A and 11B in their fully extended positions, as shown in FIGURE 3, are threaded through aligned apertured portions of the sheet metal elements which are to be fastened, after which the sleeve member 10 is maintained stationary while the nut member 12 is turned in a clockwise direction, as viewed in FIGURE 2, to thereby produce withdrawal of the needle members 11A and 11B to their positions shown in FIGURE 4 where the external shouldered portions thereof serve to clamp or fasten the sheets 30, 31 against the nose portion 10B. During such retraction of the needle members 11A, 11B, the spreader 10A engages the cam-shaped internal shouldered portions of the needle members to spread or deflect the same outwardly to achieve the above-mentioned clamping.

During this retraction and outward deflection of the needle members 11A, 11B, they move longitudinally without turning because of the engagement of the flat portions 11C on screw member 11 with cooperating internal hexagonal land surfaces on sleeve member 10. In other words, the screw member 11 is not turned, the same being permitted to move longitudinally only within sleeve member 10.

It will be seen that the fastener may be released by turning the nut member 12 in the opposite direction where again the condition illustrated in FIGURE 3 is achieved.

It will also be seen that the elements of the fastener always stay assembled since permissive movement is limited on the one hand by engagement of the nut 12 with the sleeve 10 on one hand and by engagement of the nose portion 10B with the external shouldered portions of needle members 11A and 11B on the other hand.

In the modification shown in FIGURE 8, the nut member 12 is provided with an external hexagonal portion 12E which is of dimensions to fit standard size impact tools and torque wrenches and the same may be formed contiguous with a knurled portion 12F, if desired.

It will be seen from the foregoing constructions that the fastening and unfastening operations are facilitated thereby. It is noted in particular that the T-shaped spreader 10A powers the needle members 11A and 11B outwardly during the fastening operation, and in the unfastening operation the T-shaped spreader is disengaged from the clamping elements 11A, 11B to permit quick and easy removal of the entire clamping device.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A clamp of the character described comprising a sleeve member, a screw member, a nut member, said sleeve member carrying a spreader element, said screw member being slidably positioned in said sleeve member and carrying a pair of deflectable needle members cooperating with said sleeve member for clamping materials therebetween, said spreader being positioned between said needle members and cooperating with the same to deflect and spread them apart, said nut member having threads of one direction engaging a threaded portion of said sleeve member and having threads of a direction opposite to said one direction engaging a threaded portion of said screw member, and means cooperating between said screw member and said sleeve member preventing relative turning movement between the screw member and sleeve member, said nut member having a portion thereof engageable with a stop portion on said sleeve member after said nut member extends said needle members furthermost from said sleeve member to prevent further relative movement between, on the one hand, said nut member and, on the other hand, said sleeve member and said screw member, said sleeve member having an external flat portion for engagement with a tool to prevent its rotation, and said nut member having a flat portion for engagement with a turning tool to rotate the same.

2. A clamp of the character described comprising, a screw member carrying a pair of deflectable needle members, a sleeve member slidably receiving said screw member and having a spreader extending between said needle members and cooperating therewith to deflect and spread said needle members outwardly from said spreader for clamping materials between said sleeve member and said needle members, means for moving said screw member longitudinally in said sleeve member, said means comprising a nut member screw-threadedly attached to both said sleeve member and said screw member with the screw threads on said sleeve member and screw member being of opposite hands, said nut member having a portion thereof engageable with a stop portion on said sleeve member after said nut member extends said needle members furthermost from said sleeve member to prevent further relative movement between, on the one hand, said nut member and, on the other hand, said sleeve member and said screw member, and means cooperating between said sleeve member and said screw member for preventing relative turning between the two but permitting slidable movement between the same, said nut member having tool engaging means thereon whereby the same is turned, and said sleeve member having external means thereon whereby the same is prevented from rotating.

3. A clamp as set forth in claim 2 in which said tool engaging means comprises a hexagonal portion on said nut member for application of a turning force thereto and said external means on said sleeve member comprises an external hexagonal portion for application of a tool to prevent turning of said sleeve member.

4. In a releasable clamp of the character described, a sleeve member, a screw member, a nut member, said sleeve member having an external right-hand screw thread, said sleeve member having an internal hexagon surface, said sleeve member having an external hexagonal portion for engagement with a tool to prevent its rotation, a spreader element mounted on one end of said sleeve member, a screw member having integrally formed cantilever-supported and deflectable shouldered needle elements in side-by-side relationship with said needle elements cooperating with said sleeve member to clamp materials therebetween, said spreader element being positioned between said needle elements and engageable with the same to deflect the same apart, said screw member having an external hexagonal portion snugly slidably mounted on said internal hexagonal surface of said sleeve member to allow sliding movement but prevent rotation therebetween, said screw member having an external left-hand thread, a nut element having an internal right-hand thread engaging said external right-hand thread on said sleeve member, and said nut element having an internal left-hand thread engaging said external left-hand thread on said screw member, said nut member having a portion thereof engageable with a stop portion on said sleeve member after said nut member extends said needle members furthermost from said sleeve member to prevent further relative movement between, on the one hand, said nut member and, on the other hand, said sleeve member and said screw member, said nut member having tool engaging means thereon whereby the same is turned.

5. In a clamp of the character described wherein a pair of spring shouldered needle members are spaced apart and spread apart by engagement of a spreader element positioned between said needle members, and wherein said spreader element is carried on a first member and said needle members are carried on a second member, and wherein said second member is slidably mounted on said first member and wherein said needle members cooperate with said first member for clamping materials therebetween, the improvement which resides in providing a screw thread on each of said first and second members with the screw thread on said first member extending in a direction which is in the opposite direction than the direction of the screw thread on said second member, a nut member having two screw-threaded portions, one of which engages the screw thread on said first member and the other one of which engages the screw thread on said second member, said nut member being engageable with a stop portion of said first member after said nut member extends said needle members furthermost from said first member to prevent further relative movement between, on the one hand, said nut member and, on the other hand, said first and second members, said nut member having tool engaging means thereon whereby the same is turned, cooperating means between said first and second members for preventing rotation therebetween, and said first member having external means thereon whereby the same is prevented from rotating.

6. A clamp of the character described, comprising a screw member carrying a pair of deflectable needle members, a sleeve member slidably receiving said screw member, cooperating means between said sleeve member and said screw member for preventing rotation therebetween, said sleeve member having a spreader extending between said needle members and cooperating therewith to deflect and spread said needle members outwardly from said spreader, and means for moving said screw member longitudinally in said sleeve member, said means comprising a captive drive nut rotatably carried by said sleeve member and mounted for limited axial movement with respect thereto, said nut being arranged to engage with the threaded portion of said screw member to forcefully and positively move said screw member axially fore and aft in said sleeve member to positively clamp and positively release a work piece assembly clamped between said sleeve member and said needle members, said drive nut having tool engaging means thereon whereby the same is turned, said sleeve member having external means thereon whereby the same is prevented from rotating.

7. A clamp as set forth in claim 6 in which said captive nut is mounted to said sleeve member for said limited axial movement by the interengagement of cooperating screw threads on said nut and said sleeve member.

References Cited by the Examiner
UNITED STATES PATENTS

| | | | |
|---|---|---|---|
| 531,785 | 1/1895 | Didier | 254—102 |
| 2,775,155 | 12/1956 | Thompkins et al. | 85—6 |
| 2,826,631 | 3/1958 | Rohe | 85—32 |
| 3,052,941 | 9/1962 | Abolins et al. | 287—60 |
| 3,144,805 | 8/1964 | Lee | 85—81 |

CARL W. TOMLIN, *Primary Examiner.*

EDWARD C. ALLEN, M. HENSON WOOD, Jr., *Examiners.*